United States Patent [19]

Hayes et al.

[11] Patent Number: 5,007,058

[45] Date of Patent: Apr. 9, 1991

[54] MILLIMETER WAVE POWER GENERATOR

[75] Inventors: Cecil L. Hayes, Placentia; Derek T. Cheung, Thousand Oaks; Harold R. Fetterman, Pacific Palisades, all of Calif.

[73] Assignee: Rockwell International Corporation, El Segundo, Calif.

[21] Appl. No.: 508,071

[22] Filed: Apr. 11, 1990

[51] Int. Cl.[5] .................................... H01S 1/00

[52] U.S. Cl. .................................... 372/4; 372/20; 372/38

[58] Field of Search .................... 372/4, 8, 9, 20, 38, 372/23; 331/37.42, 74; 350/163

[56] References Cited

U.S. PATENT DOCUMENTS

| | | | |
|---|---|---|---|
| 4,233,569 | 11/1980 | Liu | 372/23 |
| 4,272,730 | 6/1981 | Digiovanni | 331/38 |
| 4,503,403 | 5/1985 | Taylor et al. | 331/37 |
| 4,874,953 | 10/1989 | Katz | 372/4 |
| 4,951,006 | 8/1990 | Cohen | 331/74 |

*Primary Examiner*—Frank Gonzalez
*Assistant Examiner*—Galen J. Hansen
*Attorney, Agent, or Firm*—H. Fredrick Hamann; George A. Montanye; Tom Streeter

[57] ABSTRACT

A millimeter wave power generator combines two laser beams, tuning the beat frequency to the desired millimeter wave value with an opposing pair of millimeter wave cavities. The combined beam is diffracted onto a plurality of externally powered, modulation doped field effect photodetectors (MDFEPs). A plurality of antennas is provided, one between each pair of adjoining MDFEPs. The antennas are parallel, and each is driven by the MDFEPs at its ends. The back propagating millimeter wave radiation is reflected forward by a wire grid parallel to the antennas. The grid is situated between the diffractor and the MDFEPs, and is spatially tuned to constructively interfere the reflected back propagating with the forward propagating millimeter wave radiation.

12 Claims, 10 Drawing Sheets

MILLIMETER WAVE POWER GENERATOR

This invention was made with Government support under Contract No. DAAH01-82-C-0716 awarded by the Army. The Government has certain rights in this invention.

BACKGROUND OF THE INVENTION

The present invention relates to millimeter wave power generators, and has particular relation to such generators which produce millimeter waves of high power, high coherence, high stability of frequency and phase, and high flexibility of frequency and phase.

The millimeter wave spectral region is where microwave and optical radiation merge. The conventional method of producing millimeter wave radiation is to increase the frequency of microwave radiation rather than to reduce the frequency of optical radiation. This approach is limited by the Manley-Rowe relation: the efficiency of the generator will not exceed the ratio of the frequency change. Increasing the frequency of microwave radiation by three orders of magnitude, a fairly conventional approach, therefore results in a maximum possible efficiency of 1/10th of 1%, which is undesirably low in many situations.

Reducing the frequency of optical radiation does not run into the Manley-Rowe limitation, but runs into a separate limitation of its own: lasers (a very suitable source of optical radiation) are generally low power devices themselves. Even with good efficiency, the optical power base is so low that significant millimeter wave power is, again, difficult to achieve.

SUMMARY OF THE INVENTION

It is an objective of the present invention to produce high power millimeter wave radiation by reducing the frequency of optical radiation.

It is a feature of the present invention that this high power millimeter wave radiation may be produced in a highly coherent form.

It is a further feature of the present invention that the phase and frequency of the millimeter wave radiation are controlled by external laser sources, the phase and frequency stability of which may themselves be highly controlled.

It is an advantage of the present invention that there is a resulting similarly high control of the frequency and phase stability of the millimeter wave radiation.

It is a further advantage of the present invention that there is a resulting flexible tuning and controlling of the frequency and phase of the millimeter wave radiation, obtainable by tuning and controlling the external lasers.

BRIEF DESCRIPTION OF THE DRAWINGS

These and other objectives, features, and advantages of the present invention are shown in the following drawings of a particular embodiment of said invention, in which.

DETAILED DESCRIPTION OF A PREFERRED EMBODIMENT

Figure 1:
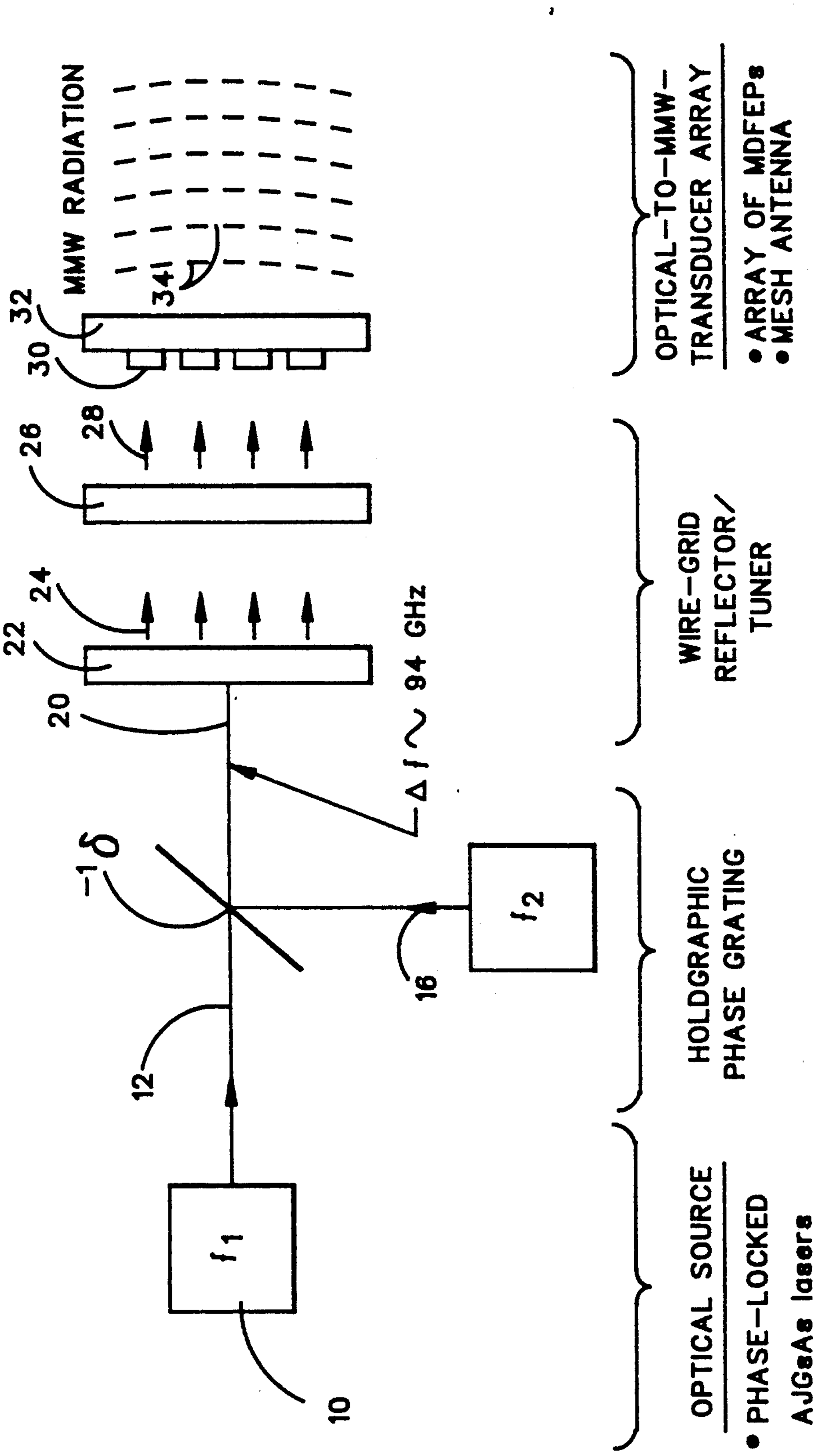
FIG. 1 is an overall schematic diagram of the present invention.

Turning now to FIG. 1, an overall view of the present invention is shown. A first laser 10 producing a first beam of radiation 12 of frequency $f_1$, and a second laser 14 producing a beam 16 of frequency $f_2$, both shine on a half silvered mirror 18, which combines the beams into a beam 20, which falls upon a holographic phase grating 22. The grating 22 breaks up this large beam 20 into a multiplicity of smaller beams 24 which pass between the wires of a grid 26, which is positioned to reflect and tune the millimeter wave radiation which will ultimately be produced. The tuned beams 28 which have passed through the grid 26 fall upon a multiplicity of optical-to-millimeter wave transducers 30, which rest on a substrate 32 which is transparent to millimeter wave radiation 34 radiating forward. While millimeter wave radiation 34 also radiates back toward the reflector 26, the reflector 26 is polarized such that the wires of the reflector 26 reflect it back forward.

Figure 2:
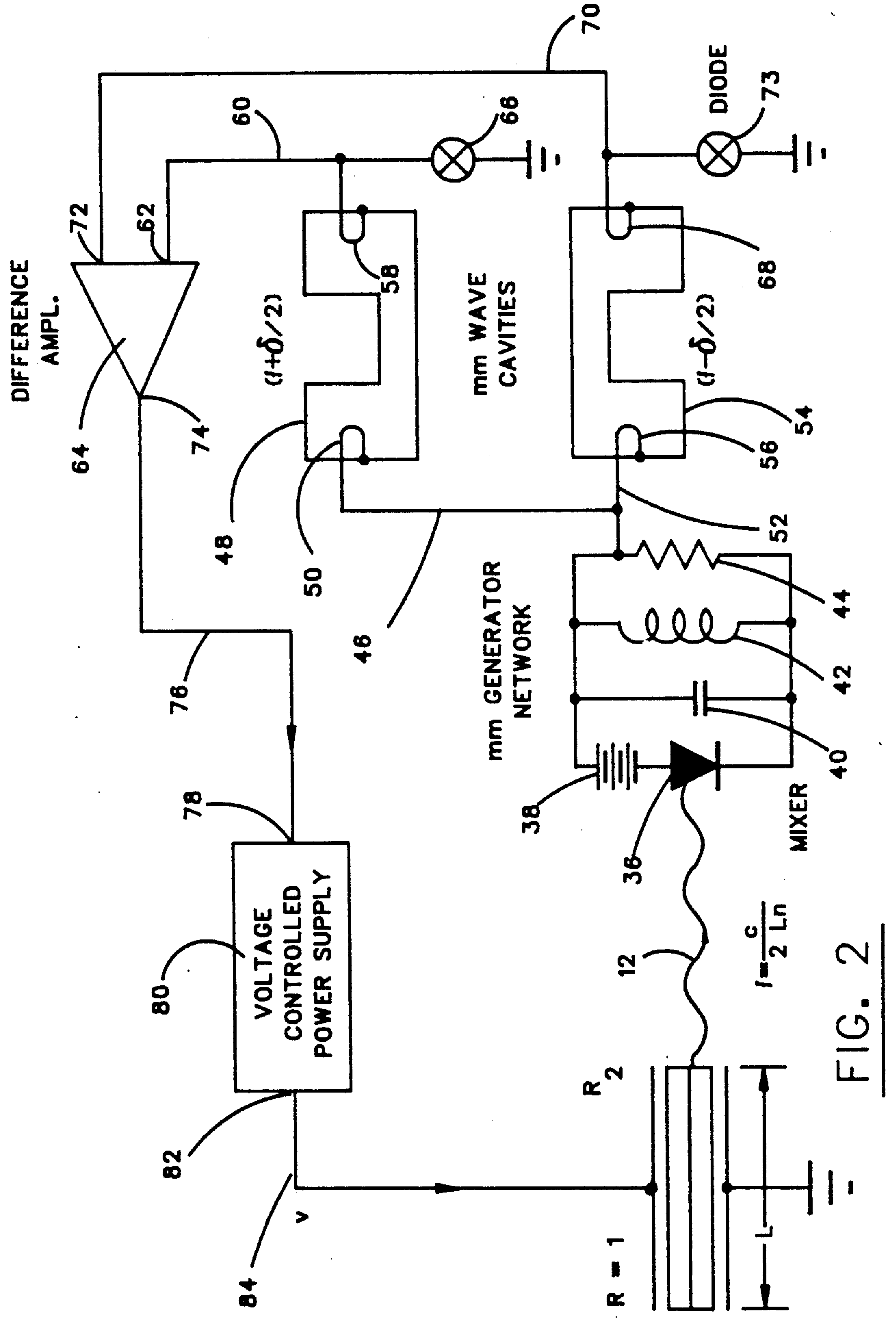
FIG. 2 is a schematic diagram of the apparatus for controlling the phase and frequency of the external laser sources.

Turning now to FIG. 2, apparatus for phase locking the lasers is shown. A laser 10 produces a beam 12 which falls on a mixer 36. The mixer 36 is a photodiode, upon which also falls the beam 16 produced by the second laser 14 (not shown on FIG. 2). The mixer 36 is powered by a voltage source 38, and is connected in parallel with a capacitance 40, inductance 42, and resistance 44. The values for the capacitance 40, inductance 42, and resistance 44 are selected to produce millimeter waves, the exact frequency of which will be determined by the beat frequency of the two laser beams falling upon the mixer 36.

The millimeter waves are produced on the side of the resistor 44 electrically closer to the voltage source 38, and pass along a first conductor 46 to a first millimeter wave cavity 48, and are injected into the first cavity 48 by a first transmitting antenna 50. The same millimeter waves are transmitted by a second conductor 52 to a second millimeter wave cavity 54, and are injected therein by a second transmitting antenna 56. The two cavities 48 and 54 are tuned to frequencies which differ by a difference d, and which have an average frequency f, which is the frequency which is desired to be produced by the transducers 28.

The millimeter waves passing through the first cavity 48 are received by a first receiving antenna 58 and are transmitted along a first amplifier lead 60 to a first amplifier input 62 of a difference amplifier 64. This lead 60 is grounded through a diode 66. Likewise, the millimeter waves passing through the second cavity 54 are received by a second receiving antenna 68 and are transmitted along a second amplifier lead 70 to a second amplifier input 72 of the difference amplifier, which is grounded through a second diode 73. The difference amplifier 64 produces a signal at its output 74 which is transmitted along a power supply lead 76 to a power supply input 78 of a power supply 80. The power produced by the power supply 80 at its output 82 is controlled by the voltage received at its input 78, and is transmitted along a laser lead 84 to the laser 10.

Operation of the foregoing apparatus is apparent from the foregoing description of its structure. If the laser 10 produces a beam of too high of a frequency, then more radiation will get through the first cavity 48, and less will get through the second cavity 54, thereby increasing the voltage at the input 62 and decreasing it at the input 72, reducing voltage at the output 74, reducing the power reduced by the power supply 80, and reducing the frequency produced by the laser 10. If the laser 10 produces a beam of too low of a frequency, then more radiation will pass through the second cavity 54, and less will pass through the first cavity 48, and the entire process will operate in reverse.

It should be noted that the foregoing feedback mechanism tracks the beat frequency between the lasers 10 and 14, and does not track the absolute frequency produced by either of them. The laser 14, which is not subjected to this feedback loop, may be independently stabilized by apparatus forming no part of this invention, or it may be allowed to drift, provided that the rate of drift is less than the rate at which the beat frequency is fed back through the above apparatus. If desired, both the laser 10, as shown in FIG. 2, and the laser 14 (not shown in FIG. 2) may be introduced into the feedback loop, but this is usually not necessary.

Figure 3:
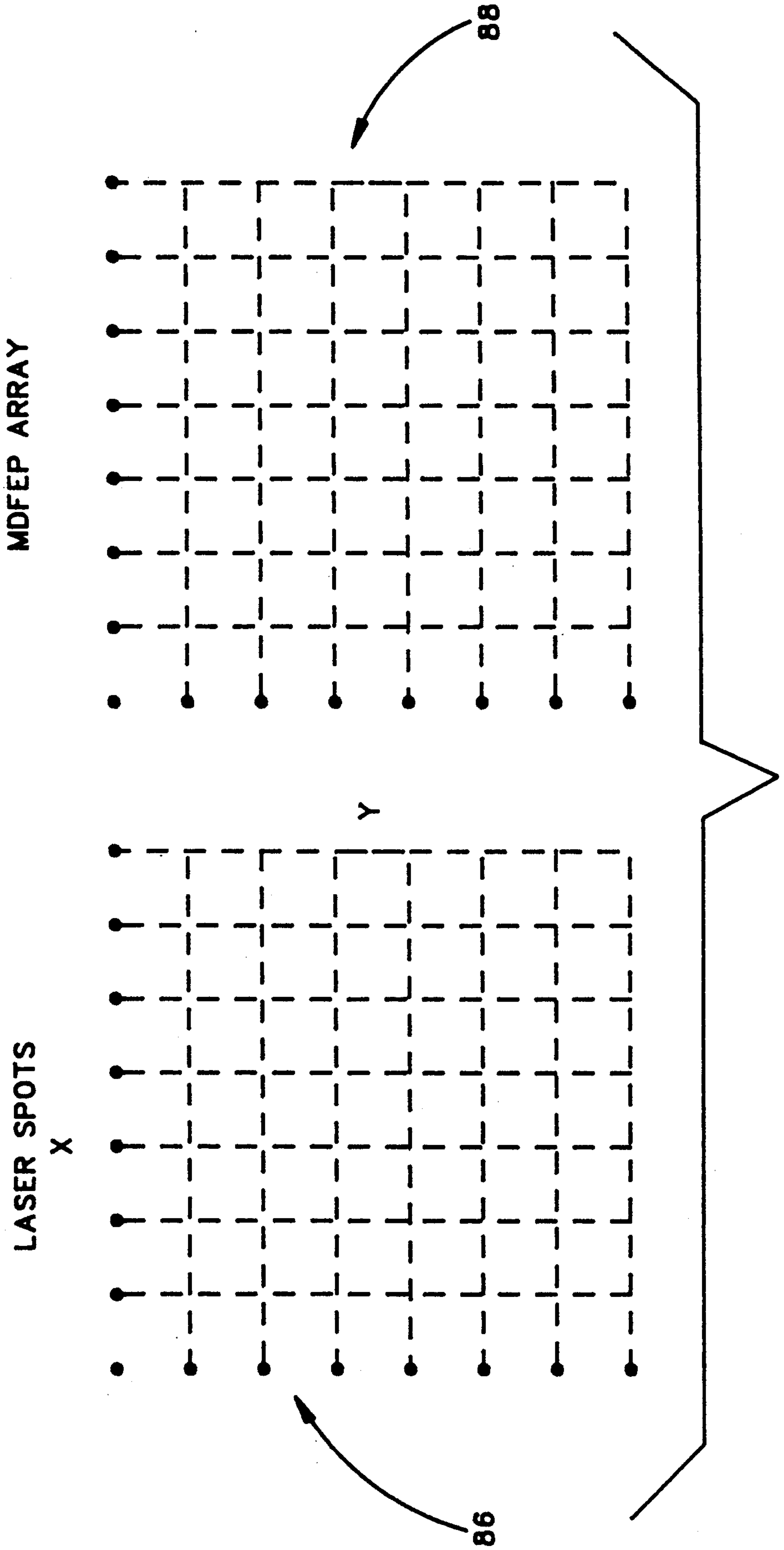
FIG. 3 is a schematic representation of the concentration of the optical radiation at particular points onto an array of MDFEPs.

As shown in FIG. 3, the holographic phase grating 22 breaks the combined beam 20 into a rectangular array of beams 24, which form a rectangular array of laser spots 86. A like array of modulation doped field effect photodetectors (MDFEPs) 88 are set out to be illuminated by these laser spots. Applicants prefer a 14×14 array, but any convenient size may be used.

Figure 4A:
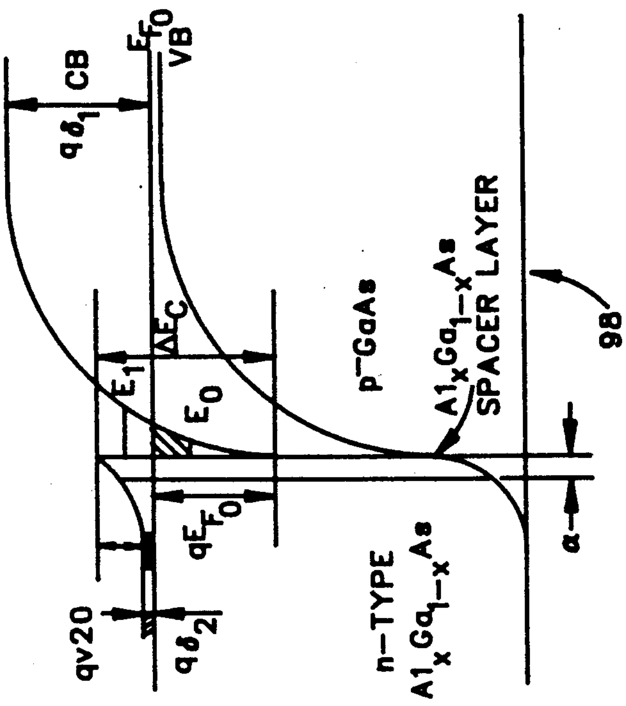
FIG. 4 is a schematic cross section of a MDFEP, including an energy diagram explaining its operation.
Figure 4:
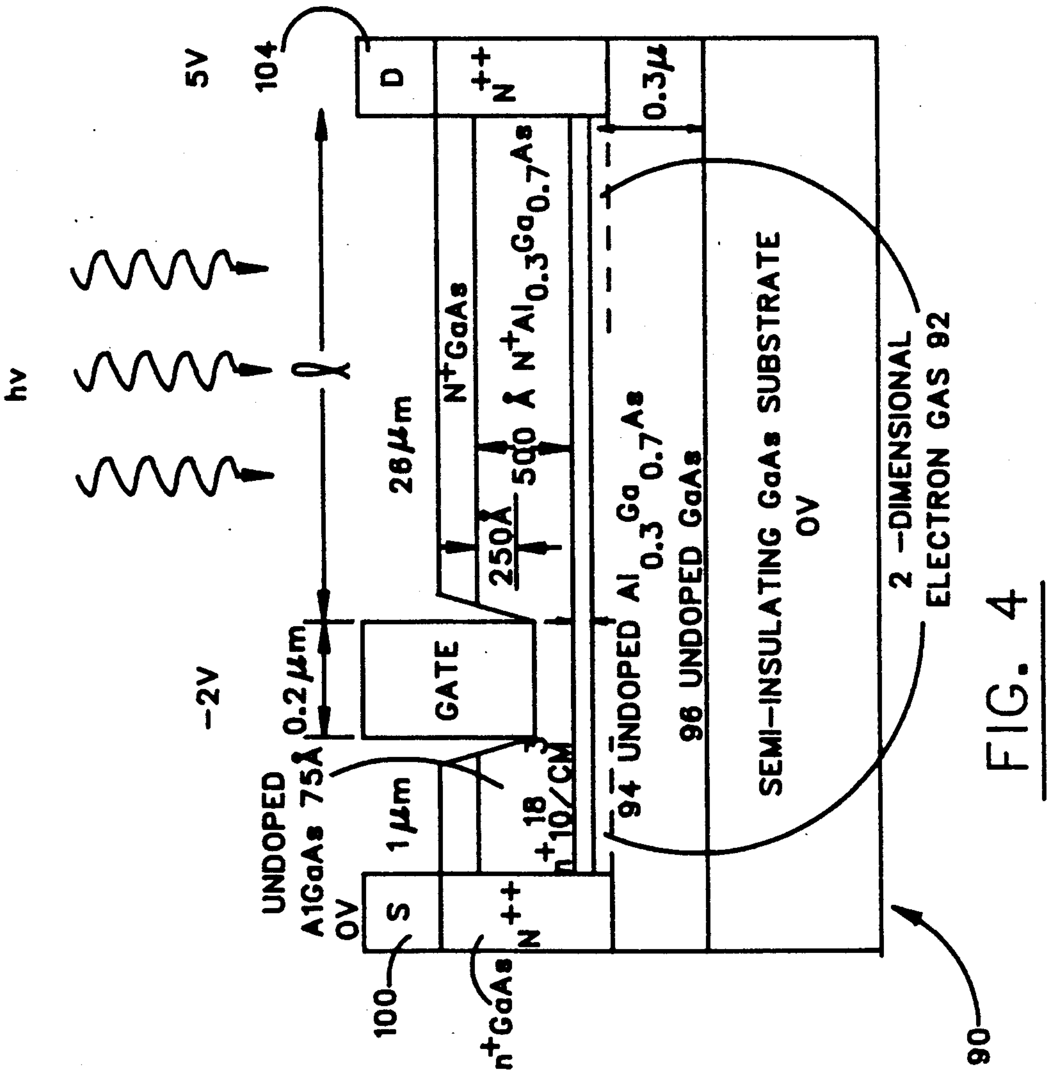

FIG. 4 shows the cross-sectional details of a MDFEP 90. A two dimensional electron gas (2 DEG) 92 develops at the interface between the undoped aluminum gallium arsenide 94 and the undoped gallium arsenide 96. Operation is apparent from the energy diagram 98. When the source 100 is kept at zero volts, and a negative two volt pinch off voltage is applied to the gate 102, with the drain 104 being held at 5 volts, the 2 DEG 92 will be responsive to incident radiation.

Figure 5:
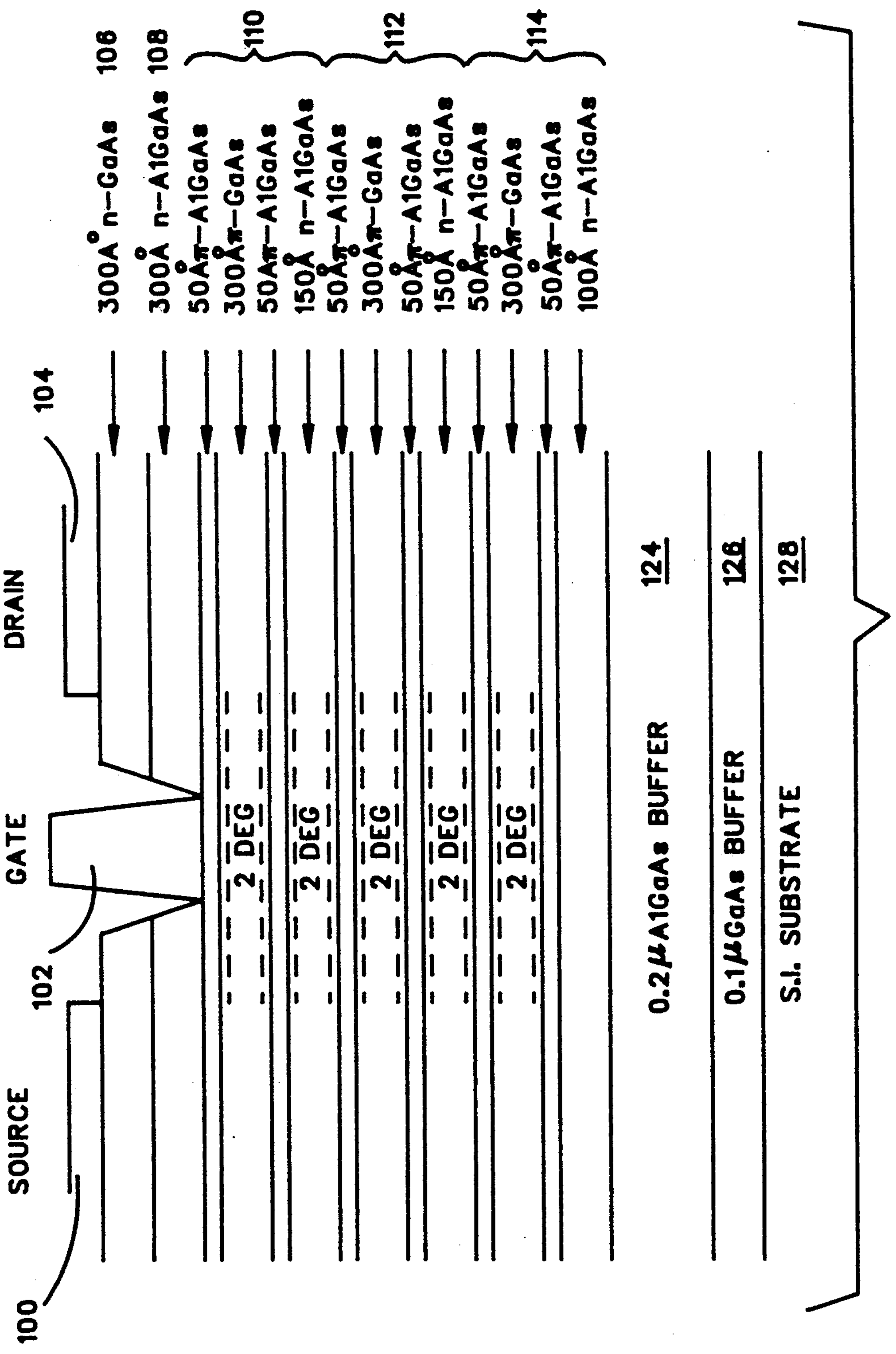
FIG. 5 is a schematic drawing of a MDFEP which utilizes multiple layers of two dimensional electron gas.

Turning now to FIG. 5, one type of apparatus is shown for multiplying the effectiveness of the apparatus shown in FIG. 4. Instead of a single layer of two dimensional electron gas, six layers are created. The source 100 and drain 104 rest on an N doped gallium arsenide upper layer 106, which in turn rests on an N doped aluminum gallium arsenide upper layer 108. The aluminum gallium arsenide upper layer 108, and the gate 102, rest upon an upper 2 DEG structure 110, which rests upon a middle 2 DEG structure 112, which rests upon a lower 2 DEG structure 114. As is shown in, for example, the lower 2 DEG structure 114, a thick layer of P doped gallium arsenide 116 is sandwiched between two thinner layers of P doped aluminum gallium arsenide 118 and 120. At each interface between the gallium arsenide and the aluminum gallium arsenide, a 2 DEG forms. The P doped aluminum gallium arsenide of each 2 DEG structure is separated from the adjoining layer of P doped aluminum gallium arsenide of the adjoining 2 DEG structure by a layer of N doped aluminum gallium arsenide 122. The lower 2 DEG structure 114 rests upon an aluminum gallium arsenide buffer 124, which in turn rests upon a gallium arsenide buffer 126, which in turn rests upon a silicon substrate 128.

Figure 6:
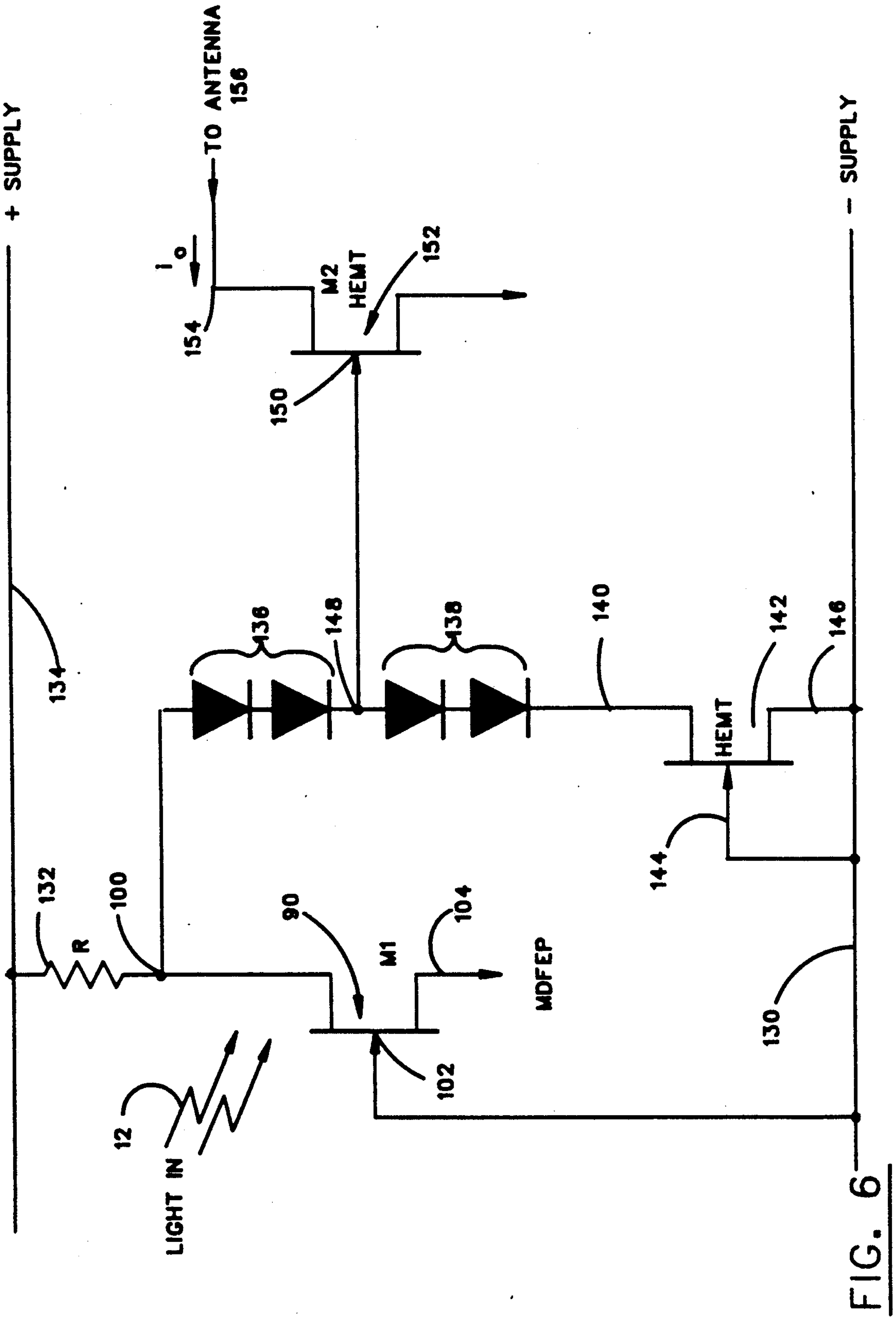
FIG. 6 is a schematic diagram of a MDFEP being used to energize an antenna after amplification by two HEMTs.

FIG. 6 shows another way of multiplying the effectiveness of the MDFEP 90. A negative power supply 130 is connected to the gate 102 of the MDFEP 90, upon which incoming light 12 falls. The source 100 is connected through a resistor 132 to a positive power supply 134. The source 100 is also connected in series through a first pair of biasing diodes 136 and a second pair of biasing diodes 138 to the source 140 of a first high electron mobility transistor (HEMT) 142, also known as a modulation doped field effect transistor (MDFET). A MDFET is similar to a MDFEP, but is electrically controlled, rather than optically controlled. The gate 144 and drain 146 of the first HEMT 142 are also connected to the negative power supply 130.

The point 148 between the first pair of biasing diodes 136 and second pair of biasing diodes 138 is connected to the gate 150 of a second HEMT 152, the source 154 of which is connected to an antenna 156. Thus, the current drawn from the antenna 156 is a greatly amplified version of the light 12 falling on the MDFEP 90.

Figure 7:
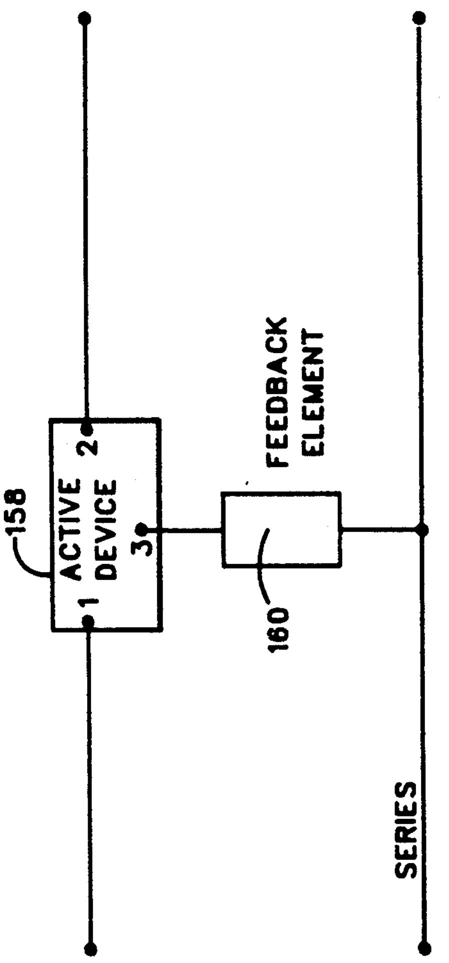
FIG. 7 shows the use of a MDFEP as an injection-locked oscillator, with the feedback element being connected in series.
Figure 8:
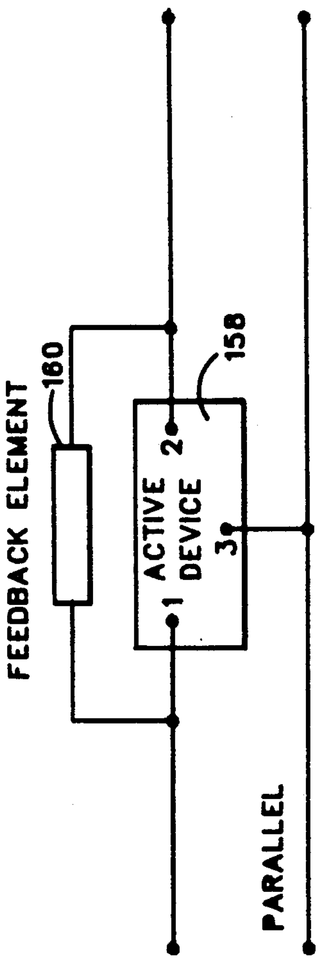
FIG. 8 is similar to FIG. 7, except that the feedback element is connected in parallel.
Figure 9:
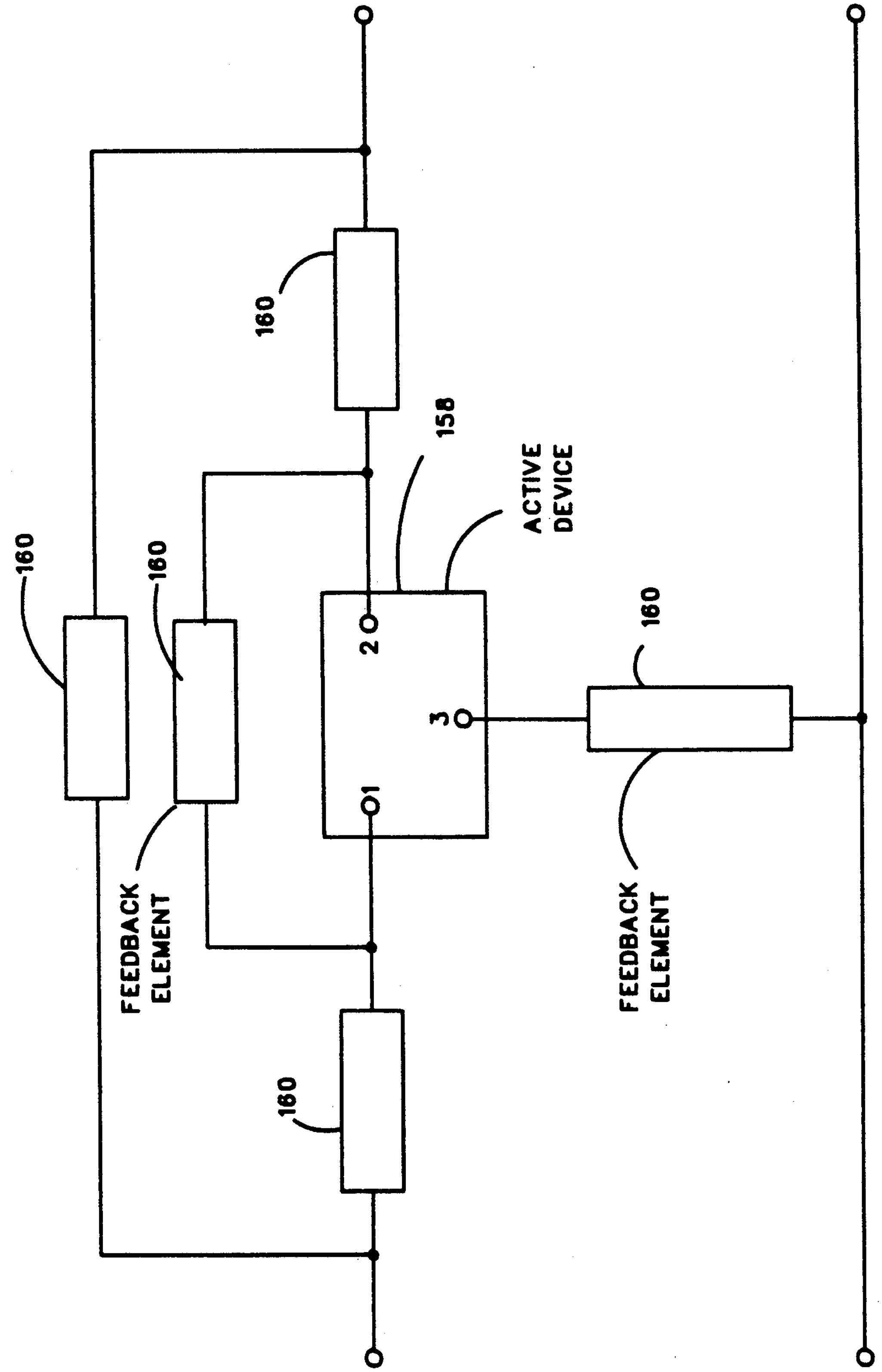
FIG. 9 is similar to FIGS. 7 and 8, except that multiple feedback elements are shown in various combinations of series and parallel connections.

FIGS. 7, 8, and 9 show a third way of increasing the effectiveness of each MDFEP: operating it as an injection-locked oscillator using appropriate feedback circuits. Such feedback circuits are shown in FIG. 7, in which the active device 158 and feedback element 160 are connected in series; in FIG. 8, in which they are connected in parallel; and in FIG. 9, in which they are connected in a higher order involving both series and parallel feedback.

Figure 10:
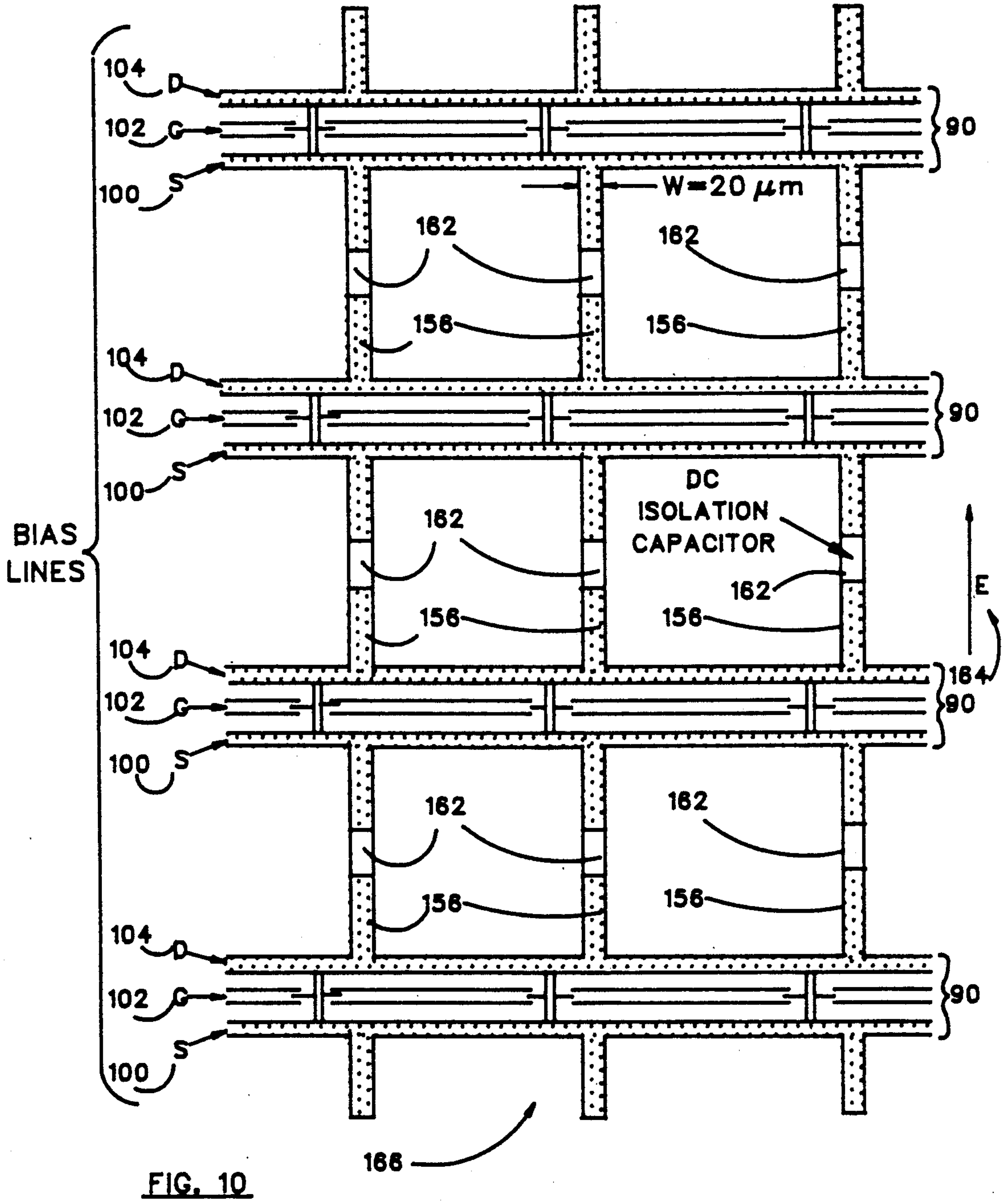
FIG. 10 is a simplified representation of an array of MDFEPs, with antenna elements extending between adjoining MDFEPs, and capacitors isolating said MDFEPs from dc connection with each other, and showing the direction of the resultant E field.

As shown in FIG. 10, and regardless of how or whether the MDFEPs 90 are rendered more effective, each MDFEP 90 drives an antenna 156 extending between the drain 104 of that MDFEP 90 and the source 100 of the adjoining MDFEP 90. Since it is often convenient to keep all of the sources 100 at a common voltage, and all of the drains 104 at a different common voltage, a DC isolation capacitor 162 is inserted in the middle of each antenna 156, isolating these source voltages from these drain voltages, yet allowing the millimeter wave frequencies to pass through unimpeded. Since the alternating currents are all flowing up and down, the resultant E field 164 will also be polarized vertically. The MDFEPs 90 and associated antennas form a mesh structure 166.

Figure 11:
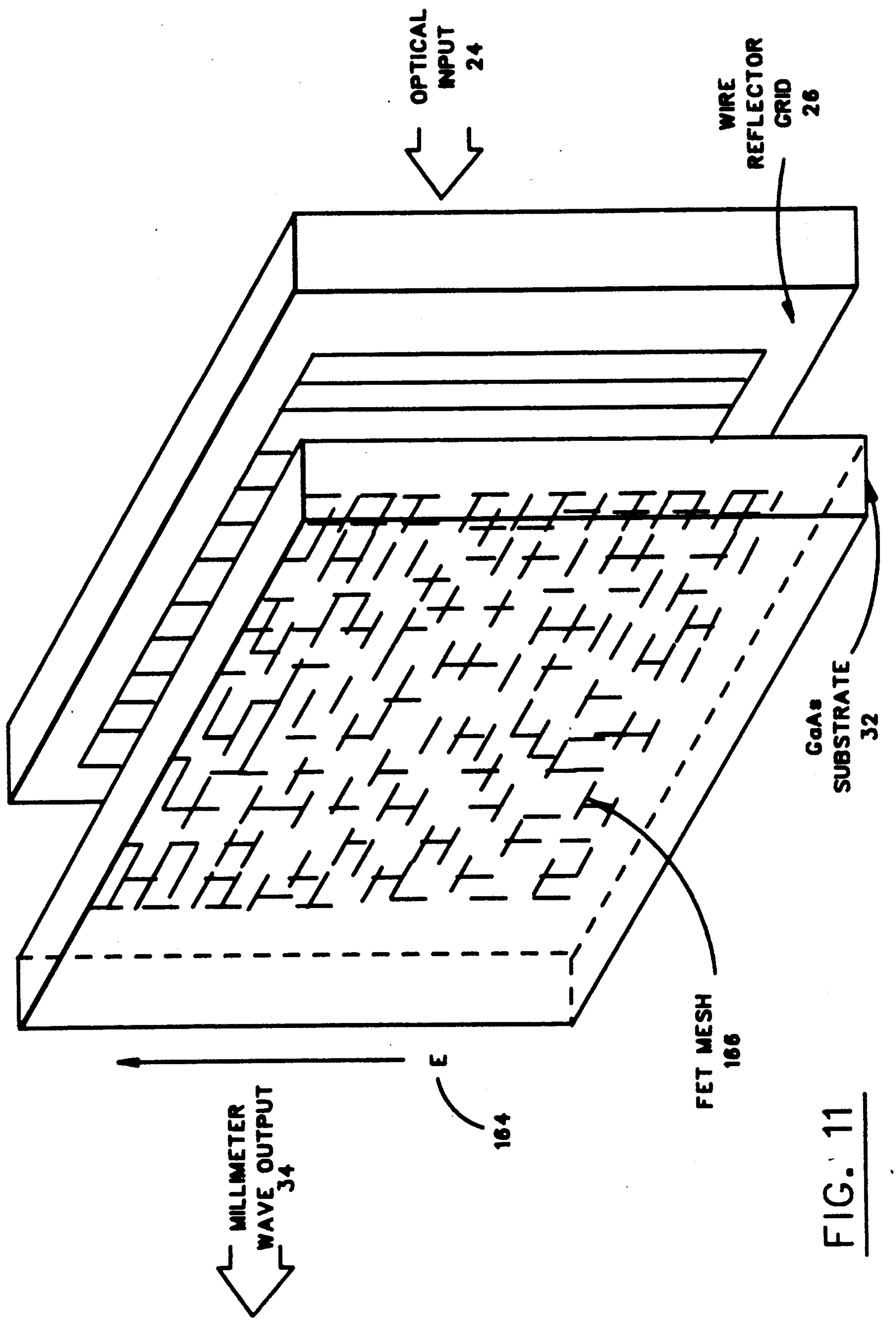
FIG. 11 shows the FET mesh, with the resulting E field, and a wire reflector grid behind the FET mesh which reflects the millimeter waves having that E field orientation.

Turning now to FIG. 11, the E field 164 is again shown as being vertical, as are the wires of the reflector grid 26. The optical input 24 may easily pass between these wires, yet, because the E field 164 and the wires of the grid 26 are parallel, the millimeter wave radiation passing backward (in the direction of the source of the optical input 24) will be reflected forward by the reflector grid 26, and will join the millimeter wave output 34 which has radiated forward directly. Carefully adjusting the distance between the mesh structure 166 and the wire reflector grid 26 allows constructive interference to take place between the millimeter wave output produced directly and that produced by reflection from the reflector grid 26. The gallium arsenide substrate 32 is transparent to millimeter waves 34, although it need not be, and generally is not, transparent to the optical input 24.

Since each separate MDFEP 90 (and associated antenna 156) is driven by a common input optical signal 24, coherent radiation is easily obtained by placing the separate antennas 156 and MDFEPs 90 at the appropriate locations of the expanding optical wavefront. Likewise, separating the antennas 156 one from another at the appropriate distances allows this coherent radiation to propagate forward in whatever precise direction may be desired. Finally, high precision in the manufacture of the MDFEPs 90 and the antennas 156 is not required; they do not operate identically because they are all identically manufactured to the same precise standard, but because they are driven by the identical optical wave. Since this optical wave may be stabilized, and tuned, entirely separately from the optical to millimeter wave transducer, the resulting millimeter waves may also be made exceptionally stable and tunable, both in frequency and in phase.

Industrial Applicability

The present invention is capable of exploitation in industry and can be used, whenever high power, highly coherent, highly stable, and highly flexible millimeter wave power is desired. Any suitable photodetector with a high enough frequency response may be used to make the present invention.

While a particular embodiment of the present invention has been described above, the true scope and spirit of the present invention is not limited to this embodiment, but only by the appended claims.

What is claimed is:

1. A millimeter wave power generator, comprising:

a source of first frequency optical radiation;

a source of second frequency optical radiation, interfering with said first frequency optical radiation and tuned to produce beat frequency optical radiation upon said interference, said beat frequency optical radiation having a preselected millimeter wave beat frequency;

means for separating said beat frequency optical radiation into a plurality of beams;

a plurality of externally powered optical-to-millimeter wave transducers, each of which is respectively driven by the beat frequency of one of said beams; and a plurality of antennas, each of which extends between and is driven by a respective pair of said transducers.

2. The generator of claim 1, wherein said antennas are aligned to produce millimeter wave radiation of a common E field polarization.

3. The generator of claim 2, further comprising a reflector grid of wires, each of which is aligned parallel to said E field polarization.

4. The generator of claim 3, wherein said reflector grid is situated between said means for separating said beat frequency optical radiation into a plurality of beams and said plurality of externally powered optical-to-millimeter wave transducers, said beams passing between said wires of said grid.

5. A method for generating millimeter wave power, comprising:

interfering first frequency optical radiation with second frequency optical radiation to produce beat frequency radiation;

tuning said beat frequency of said beat frequency optical radiation to a preselected millimeter wave beat frequency;

separating said beat frequency optical radiation into a plurality of beams;

respectively driving each of a plurality of externally powered optical-to-millimeter wave transducers by one of said beams;

driving each of a plurality of antennas by a respective pair of said transducers.

6. The method of claim 5, wherein said antennas are aligned to produce millimeter wave radiation of a common E field polarization.

7. The method of claim 6, further comprising the step of reflecting millimeter wave radiation from a reflector grid of wires, each of which is aligned parallel to said E field polarization.

8. The method of claim 7, wherein said reflector grid is situated between a means for separating said beat frequency optical radiation into a plurality of beams and said plurality of externally powered optical-to-millimeter wave transducers, said beams passing between said wires of said grid.

9. Apparatus for generating millimeter wave power, comprising:

means for interfering first frequency optical radiation with second frequency optical radiation to produce beat frequency radiation;

means for tuning the beat frequency of said beat frequency optical radiation to a preselected millimeter wave beat frequency;

means for separating said beat frequency optical radiation into a plurality of beams;

means for respectively driving each of a plurality of externally powered optical-to-millimeter wave transducers by one of said beams;

means for driving each of a plurality of antennas by a respective pair of said transducers.

10. The apparatus of claim 9, wherein said antennas are aligned to produce millimeter wave radiation of a common E field polarization.

11. The apparatus of claim 10, further comprising means for reflecting millimeter wave radiation from a reflector grid of wires, each of which is aligned parallel to said E field polarization.

12. The apparatus of claim 11, wherein said reflector grid is situated between said means for separating said beat frequency optical radiation into a plurality of beams and said plurality of externally powered optical-to-millimeter wave transducers, said beams passing between said wires of said grid.

* * * * *